United States Patent [19]
Gold

[11] Patent Number: 5,475,540
[45] Date of Patent: Dec. 12, 1995

[54] MAGNETIC DATA STORAGE DISK DRIVE WITH DATA BLOCK SEQUENCING BY USING ID FIELDS AFTER EMBEDDED SERVO SECTORS

[75] Inventor: Clifford M. Gold, Fremont, Calif.

[73] Assignee: Quantum Corporation, Milpitas, Calif.

[21] Appl. No.: 137,807

[22] Filed: Oct. 19, 1993

Related U.S. Application Data

[63] Continuation of Ser. No. 954,886, Sep. 29, 1992, abandoned, which is a continuation-in-part of Ser. No. 710,861, Jun. 4, 1991.

[51] Int. Cl.$^6$ ................................................ G11B 5/596
[52] U.S. Cl. ................... 360/48; 360/77.080; 360/51
[58] Field of Search .................. 360/77.08, 77.11, 360/77.02, 48, 51

[56] References Cited

U.S. PATENT DOCUMENTS

| | | | |
|---|---|---|---|
| 3,299,411 | 1/1967 | Capozzi et al. | 340/172.5 |
| 4,016,603 | 4/1977 | Ottesen | 360/135 |
| 4,516,162 | 5/1988 | West | 360/77.08 X |
| 4,530,014 | 7/1985 | Penniman | 360/77.08 |
| 4,672,495 | 6/1987 | Matsumoto | 360/125 |
| 4,882,671 | 1/1989 | Graham et al. | 360/77.04 X |
| 4,914,529 | 4/1990 | Bonke | 360/48 |
| 4,979,159 | 12/1990 | Tsuruoka et al. | 369/58 |
| 5,050,016 | 9/1991 | Squires | 360/77.08 |
| 5,121,280 | 6/1992 | King | 360/48 X |
| 5,146,183 | 9/1992 | Wilson | 360/77.08 X |
| 5,236,735 | 8/1993 | Yoshida et al. | 427/96 |
| 5,241,546 | 8/1993 | Peterson et al. | 371/37.1 |
| 5,274,509 | 12/1993 | Buch | 360/48 |

OTHER PUBLICATIONS

Finn Jorgensen, *The Complete Handbook of Magnetic Recording*, 3rd Ed. ©1988, pp. 43–45; 232–233.
Harold J. Mc Laughlin, "Disk File Memories" *Instruments and Control Systems*, vol. 34, Nov. 1961 pp. 2063–2068.
"SA1000 Fixed Disk Drive" *Dem Manual* ©1982 pp. 1–1, 6–1, 6–2 Shugart Associates, Inc.

*Primary Examiner*—Aristotelis Psitos
*Assistant Examiner*—James T. Wilson
*Attorney, Agent, or Firm*—David B. Harrison

[57] ABSTRACT

A magnetic data storage disk record carries a pattern of magnetic domains defining a plurality of concentric data tracks divided into data sectors by embedded servo sectors recorded at a predetermined constant frequency and containing head positioning information for positioning a data transducer head for reading the disk track. Each data sector is recorded at a data transfer rate selected in relation to displacement of the track from a center of the disk. Each data sector defines a plurality of variable length data segments which are combined to provide a fixed length user data block. In order to avoid a write-to-read transition and Barkhausen noise, each data sector begins with an ID header immediately following a servo sector. The ID header includes a plurality of count byte fields for providing a count of bytes of each one of the user data segments within the data sector, and a flag field for indicating whether the user data block begins at the first data block segment of the particular data sector. A disk drive data sequencer using the count bytes and flag bytes is also disclosed.

8 Claims, 4 Drawing Sheets

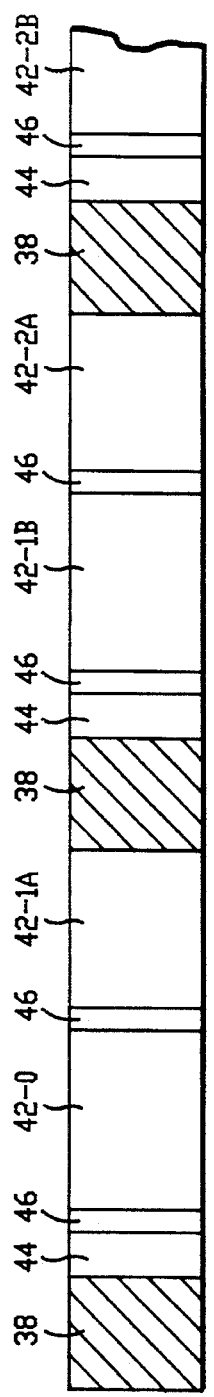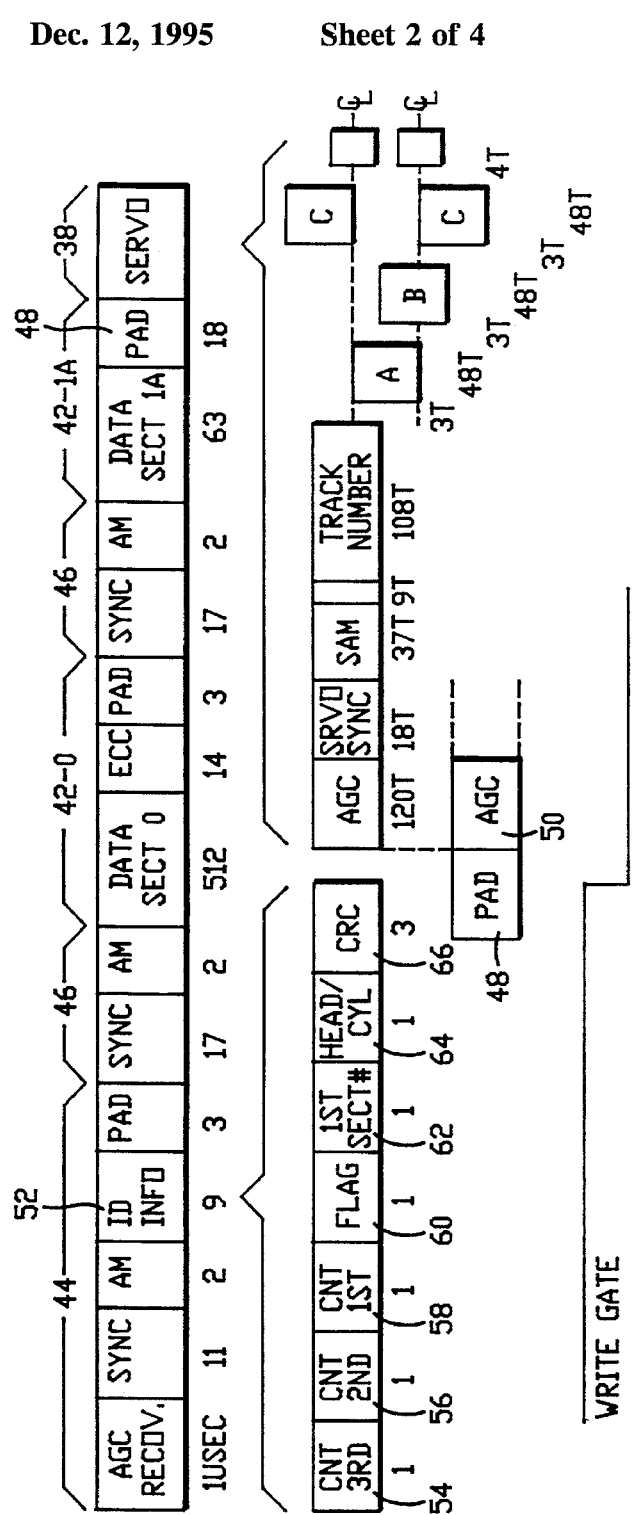
FIG.-2A  FIG.-2B  FIG.-2C  FIG.-2D  FIG.-2E  FIG.-2F

MAGNETIC DATA STORAGE DISK DRIVE WITH DATA BLOCK SEQUENCING BY USING ID FIELDS AFTER EMBEDDED SERVO SECTORS

This application is a continuation of application Ser. No. 07/954,886, filed Sep. 29, 1992, now abandoned.

FIELD OF THE INVENTION

The present invention relates to arrangement and handling of data blocks in data sectors located between embedded servo sectors on a data storage disk of a high performance disk drive. More particularly, the present invention relates to a high performance disk drive employing an ID field immediately following each embedded servo sector.

BACKGROUND OF THE INVENTION

Disk drive data storage subsystems employ rotating disks and positionable data transducer heads in order to store vast quantities of data. The disks are conventionally mounted in a vertically stacked arrangement upon a common spindle hub. An internal DC brushless spindle motor rotates the spindle hub at a predetermined angular velocity. For high performance disk drives with high data transfer rates, it is common to encounter disk speeds in the 4000 to 6000 RPM category within 3.5 inch form factor disk drives.

A mass balanced rotary voice coil actuator motor is frequently employed to rapidly move the heads of a head stack in unison. The actuator moves the head stack from a departure track location to a destination location during track seeking operations. Once the head stack has arrived at a destination location, the selected head is settled over the desired data track, and by virtue of a track following servo loop "follows" the centerline of the track. The number of data tracks within a given area, known as track density or "tracks per inch" ("TPI") is directly a function of the accuracy of the track following servo loop, as well as the effective magnetic gap or track width provided by the head itself. Flying height also affects track width and TPI.

In order to achieve sufficiently narrow track widths, thin film heads are employed. When switching from write to read modes, these heads manifest for a brief interval a phenomenon known as Barkhausen noise. Barkhausen noise is believed to result from movement of magnetic domain boundaries in response to a changing magnetic excitation field. These movements are believed to be due to impurities and imperfections in the crystal structure forming the magnetic storage surface of the disk storage media. Barkhausen noise also appears to be one of the noise sources present in magneto-resistive ("MR") heads.

Disk drive architectures are known to employ embedded servo sectors. By "embedded servo sector" is meant one or more segments of a concentric data track which is recorded with head positioning overhead information, rather than with user data. In order for a head positioning servo loop to maintain desired track following, the loop must be provided with a sufficient number of position samples with each revolution. In addition, the servo loop must have sufficient servo information processing capacity in order to develop an accurate position error signal, and to apply that signal to the actuator motor to correct for off-track tendencies during operation.

Available data storage density per track increases as one moves from radially innermost data tracks to radially outermost data tracks. In other words, outer tracks are longer than inner tracks. Also, relative velocity between the rotating disk and the non-moving head increases from the innermost tracks to the outermost tracks across the disk surface. In order to optimize data storage, zoned data recording schemes have been proposed for many years. These schemes have involved varying the number of data blocks within radial bands or zones across the storage surface. An early teaching concerning zoned data recording is found in an article by Harold J. McLaughlin entitled "Disc File Memories" in *Instruments and Control Systems*, November 1961, 6 pages. A later example of a disk drive employing a zoned data recording arrangement is found in U.S. Pat. No. 4,016,603 to Ottesen. In the Ottesen approach, servo sectors were embedded at the beginning of each data block, and the data blocks of fixed length were not interrupted by servo sectors.

More recently, split data blocks have been proposed in which the embedded servo sectors interrupt and split up the data blocks into segments. One such proposal is found in Cirrus Logic Preliminary Data Sheet, CL-SH350, Integrated Synchronous SCSI Disk Controller, November, 1989. The Cirrus document described an integrated drive controller supporting split data fields under the direct, active supervision of a programmed microprocessor controller.

One drawback of disk drives employing thin film heads, embedded servo sectors and split data fields is directly related to the Barkhausen noise interval immediately following switchover from write to read modes. In other words, because of the Barkhausen noise interval, a track format is needed which minimizes overhead data and which minimizes transitions from write mode to read mode for minimal impact upon disk drive performance.

SUMMARY OF THE INVENTION WITH OBJECTS

An object of the present invention is to provide a disk data format for a disk drive employing thin film heads such that the impact of Barkhausen noise is minimized.

Another object of the present invention is to provide a disk drive having thin film or magneto-resistive ("MR") heads with an embedded sector and split data field format adapted to minimize performance degradation from Barkhausen noise.

A still further object of the present invention is to provide an improved, efficient disk format for a disk drive employing data zones, split data fields and embedded servo sectors for head positioning.

A disk drive incorporating the present invention includes a rotating data storage disk, a thin film or MR data transducer head, a servo controlled head positioner for positioning the data transducer among concentric data storage tracks defined on a surface of the disk. The disk defines a plurality of embedded servo sectors recorded at a predetermined constant frequency across the radial extent of the disk surface and containing head positioning information, and data sectors between the servo sectors. The concentric data storage tracks are arranged in a plurality of radially offset data zones. Each zone has a data transfer rate and storage capacity adapted to radial offset thereof from a center of the disk. Each data sector contains a plurality of data segments of data blocks and includes one ID header at the beginning thereof. The ID header has a plurality of count byte fields. Each count byte field indicates a byte count for a user data block segment located within the data sector, and a flag field for indicating whether a data block begins at a first user data block segment of the data sector.

As another aspect of the present invention, a pad field is provided at the end of a data sector immediately preceding a servo sector. In this aspect, the disk drive includes a timer circuit for transitioning the data transducer head from a data writing mode to a data reading mode while the pad field is passing underneath the data transducer. As a related aspect, an AGC field is provided at the beginning of each servo sector.

As one aspect of the present invention, the flag field may further include a defective sector flag for signalling that the data sector contains a defect; an error correction flag for indicating that a segment includes an error correction field; an ID header field defect flag for signalling that the next ID header field location contains a defect; and a flag for indicating whether a data segment of the data sector is a beginning segment, intermediate segment or ending segment of a data block.

As another aspect of the present invention, a data sequencer is provided within the disk drive which makes use of the count bytes and the flag bytes in order to assemble and put out fixed length user data blocks from the variable length data segment or segments defined within each data sector.

As a related aspect of the present invention, a record with a data format for sectore of a disk track of a data storage disk includes a plurality of embedded servo sectors recorded at a predetermined constant frequency and containing head positioning information for positioning a data transducer head for reading the disk track. A data sector formed between adjacent servo sectors is recorded at a data transfer rate selected in relation to displacement of the track from a center of the disk. The data sector defines a plurality of variable length data segments of a fixed length user data block. The data sector includes one ID header at the beginning thereof. The ID header includes a plurality of count byte fields for providing a count of bytes of each one of the user data segments within the data sector, and a flag field for indicating whether the user data block begins at the first data block segment of the particular data sector.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is a series of horizontal graphs related to a portion of a data track. While the FIG. 2 graphs of the data track are rectilinear, within disk drives the tracks are typically concentric, and a truer representation would show the FIG. 2 segment as an arc segment of a circular track pattern.

DETAILED DESCRIPTION OF A PREFERRED EMBODIMENT

Data blocks are typically written to a disk storage surface, one block at a time. With split data fields, a data block of standard size, such as 512 bytes (and ECC overhead bytes appended at the end thereof), may fit entirely within a data sector which is defined as the data track space between two embedded servo sectors. Or, the data block may be split into segments, and be stored over two or more data sectors. Since the Barkhausen noise interference occurs in thin film heads when a switch is made from write mode to read mode, it is necessary to provide a sufficiently long preamble at the beginning of each servo sector so that the servo information within the embedded sector may be sampled and processed by the on-board head positioner servo loop after the Barkhausen noise has subsided. The present invention takes advantage of the fact that the start of the servo sector is relatively immune to Barkhausen noise, so that the servo information may be recovered, even if data segments are being written to on both sides of the servo sector.

Figure 1:
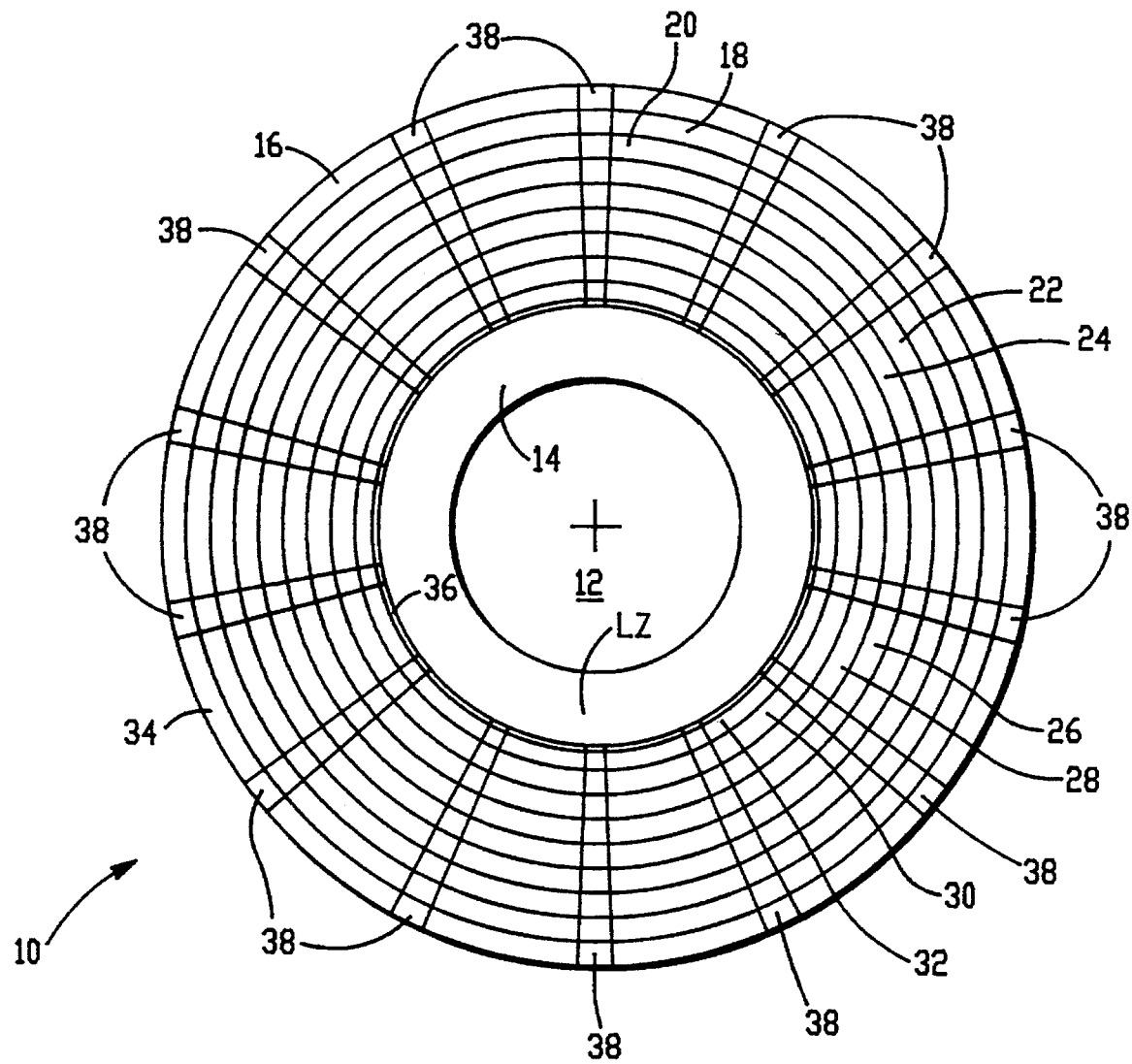
FIG. 1 is a plan view of a disk data storage surface including data track zones and split data fields, and radially/circumferentially aligned embedded servo sectors, in accordance with principles of the present invention.

With the foregoing overview in mind, a presently preferred example of a data storage layout and implementing circuitry will now be described. FIG. 1 provides a plan view of an exemplary rotating disk data storage surface. A rotating storage disk 10, which may be 3.5 inches in diameter, 2.5 inches in diameter, or 1.8 inches in diameter (or larger or smaller), is formed of suitable substrate material such as metal or glass and is coated with e.g., a magnetic storage medium such as a thin film medium vacuum sputter deposited onto the substrate. The disk 10 defines a central opening 12 to enable a rotating hub securely to clamp the disk 10 to a rotating disk spindle. Typically, although not necessarily, the spindle is integrally incorporated into a direct-drive DC brushless spindle motor.

Between an inner landing zone area 14 and an outer peripheral zone 16, a data storage area of a multiplicity of concentric data tracks is defined. The tracks are arranged into a plurality of data zones, such as eight zones 18, 20, 22, 24, 26, 28, 30 and 32, which are illustrated in FIG. 1, or more, as extending from a radially outermost zone 18 to a radially innermost zone 32. A system information zone 34 lies radially outwardly just beyond the outer zone 18, and a diagnostics and guard zone 36 lies just inside of the inner landing zone area 14.

Since the number of magnetic storage domains for a given data storage disk varies directly in function of disk radius, the tracks of the outermost zone 18 will contain considerably more user data than can be contained in the tracks located at the innermost zone 32. Each complete user data block is of a predetermined fixed storage capacity or length (e.g. 512 bytes of user data per data block); and, the density and data rates vary from data zone to data zone. Accordingly, it is intuitively apparent that the servo sectors 38 interrupt and split up at least some of the data blocks into segments, and this is in fact the case in the present example.

FIG. 1 also depicts a series of radially extending, circumferentially spaced apart servo sectors 38. In this particular example, there are preferably 64 radial servo sectors 38 (shown diagrammatically as several narrow spokes in FIG. 1) equally spaced around the circumference of the disk 10.

FIG. 2A depicts a small segment of a data track 40. The segment shown in FIG. 2A includes data fields 42 interrupted by three servo sectors 38, three ID fields 44 following each servo sector 38, and data preamble fields 46. The data fields include a first complete block 42-0 including e.g. 512 bytes of user data and 14 bytes of ECC appended at the end thereof. In the same data sector, the complete block 42-0 is followed by a first segment 42-1A of the next data block 42-1, and by a longer pad field 48 immediately preceding the middle servo sector 38.

FIG. 2B illustrates in expanded form the fields and segments of information lying between the first and second servo sectors 38 shown in FIG. 2A. In FIG. 2B, the ID field 44 includes an AGC recovery field of 1 microseconds duration. The AGC recovery field is converted to a byte count depending upon the particular data zone. This field is written during a data formatting operation with a 2T pattern (10101010 encoded). A sync field of 11 bytes in duration follows the AGC recovery field. The sync field is also a 2T pattern (101010 encoded) and enables a phase locked loop of a data synchronizer to acquire phase lock. A 2-byte ID address mark field is then provided. The ID address mark field is used for detection of end-of-sync and re-synchronization of the byte clock. The address mark pattern is one which is not used within the coding convention such as 1,7 RLL. A 3-byte pad field is provided for a write-splice between the header 44 and the adjacently following data segment, e.g. data block 42-0. The pad field is written at a medium-frequency pattern rate so that it does not appear to be a sync field or an address mark.

A 17-byte data sync field also written at a 2T pattern rate begins the data block header 46. A 2-byte data segment address mark field follows the data sync field and is distinguishable from the ID header field AM. The data header AM is followed by the data segment which in the first part of the illustrated pattern comprises a complete 512 byte data block 42-0 followed by its appended 14-byte ECC remainder. While 512 bytes is given in this example, any desired block size may be used. A 3-byte pad field follows the ECC field and provides a write-splice region. In this example, the byte clock period T has a period selected for the particular data zone, and typically varies by zone across the data surface.

The next data header field 46 includes a 17-byte data sync field, a 2-byte data segment address mark field, and a split data segment 42-1A comprising e.g. 256 bytes. Since this segment is not complete, there is no ECC field. A pad field 48 of 18 bytes duration then follows this data segment 42-1A. The servo sector 38 follows the pad field 48.

As shown in the right hand segment of FIG. 2C, the servo sector 38 includes an AGC field of 120T duration, a servo sync field of 18T duration, a servo address mark (SAM) field of 37T duration, an index field of 9T duration, a track number field of 108T duration, and three bursts A, B, C, each being 48T duration, and being separated by a 3T separation space. The interval T represents a basic servo clock period which remains constant throughout the radial extent of each servo sector 38. In a presently preferred example, T is equal to a period of approximately 37.5 nanoseconds at a sample clock rate of 26.667 MHz. This clock rate is selected to be below the maximum data transfer rate, since it extends uniformly across the entire radial extent of the disk 10 as shown in FIG. 1 and must provide a robust servo signal throughout the extent thereof.

The servo sectors 38 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. Processing of the A, B, and C servo bursts is in accordance with copending, commonly assigned U.S. patent application Ser. No. 07/569,065 filed on Aug. 17, 1990, and entitled: "Edge Servo For Disk Drive Head Positioner", now U.S. Pat. No. 5,170,299, the disclosure of which is hereby incorporated herein by reference. Detection and processing of the other fields of the servo sector 38 is as described in copending, commonly assigned U.S. patent application Ser. No. 08/180,096 filed on Jan. 11, 1994, a continuation of application Ser. No. 07/710,172 filed on Jun. 4, 1991, and entitled: "Servo Data Recovery Circuit for Disk Drive Having Digital Embedded Sector Servo", now U.S. Pat. No. 5,420,130, patented May 30, 1995, disclosure of which is hereby incorporated herein by reference. A very robust digital head position servo loop servo is realized, as described in commonly assigned, copending U.S. patent application Ser. No. 07/954,557, filed on the same date as this patent application and entitled: "Disk Drive Having On-Board Digital Sampling Analyzer", the disclosure of which being hereby incorporated by reference.

The graphs D, E and F of FIG. 2 illustrate the problem which is minimized by the present invention. These graphs illustrate generation of unwanted Barkhausen noise following a transition from data write mode to data read mode. This transition is always fixed to coincide with the extended pad field 48 and the beginning of the servo AGC adjustment field 50, and results in placing this noise in a vicinity least likely to harm operation of the disk drive. When the write-to-read mode switching operation occurs as shown in graph E (nominally midway through the pad field 48, some of the Barkhausen noise occurs for the balance of the pad field 48, and some small amount of it may spill over into the first portion of the servo sector AGC field 50.

This approach thus overcomes a drawback relating to Barkhausen noise which became manifest in the approach disclosed in the related patent application Ser. No. 07/710, 861 which placed the ID field 44 at the beginning of each physical data sector, and not necessarily immediately following each servo sector. In that approach, switchover from write mode to read mode at the end of each user data block required more pad overhead when thin film heads were employed.

In using the present ID field 44 immediately following each servo sector 38, certain information is required by a data sequencer 150 (FIG. 3) in order to manage the information found in each data sector. This information is illustrated in FIG. 2, graph C, left segment, which shows in detail the format for each ID info field 52. The info field 52 includes in LIFO format a 1-byte third segment count field 54, a 1-byte second segment count field 56, a 1-byte first segment count field 58, a 1-byte flag field 60, a 1-byte first sector number field 62, a 1-byte head/cylinder field 64, and a 3-byte CRC field 66. The segment count fields provide the byte counts for the segments of user data blocks that may be included between adjacent servo sectors (it being understood that the particular arrangement varies depending upon data layout for a particular data zone).

The count bytes are arranged in reverse order, so that they may be pushed onto a byte count stack 234 (FIG. 3) provided within the sequencer 150, as explained in greater detail hereinafter. The last count C1 for the first user data segment will be the first one popped off the stack 234 and loaded into a byte counter 236 of the sequencer 150 as the first segment of the particular data sector is being read from or written to in real time. When (and if) the next segment of the data sector is reached, the next count C2 for the second segment is then popped off of the stack 234 and into the byte counter 236, and when the third segment (if any) is reached, the third count (C3) will be popped off of the stack 234 and loaded into the byte counter 236. This activity does not take place for byte count values of zero.

In this manner, the data sequencer 150 is able to reassemble automatically the data blocks 42 as unbroken continuous byte sequences which in the case of data reads from the disk are sent into a data block buffer preparatory to being transferred to the host computer. For incoming data blocks when data is being written to a storage surface of the disk 10, the sequencer 150 uses the count bytes in order to know how many bytes to sequence to the disk surface for each data segment within the particular user data sector.

The flag byte is actually a series of individual flags specifying, e.g., whether a defective sector is present, whether the first data segment starts at its beginning or is a continuation of a previous segment of the data block in the last sector, whether the last sector has an ECC field appended to it or not, and whether the next ID field 44 has a defect and if so to look for it later on in the next data sector.

Preferably, the MSB of the flag field 60 is a "continuation" flag. If this flag is set, the sequencer 150 learns that the first data segment it will find in the data sector is a continuation of a data block from the last physical sector location. If a data block happens to be split across several servo sectors 38, the second two segments of the data block would otherwise be identical. This situation is undesirable from the point of view that if a first data segment address mark is missed, the second address mark may be mistaken for the first address mark. A second bit adjacent to the MSB is accordingly provided to cover this situation and to distinguish a first continuation segment from a second continuation segment of the data block.

The one to three lowest order bit positions are provided for defect management. If the particular data sector includes only one data block segment, only the lowest order bit will be used for defect management. It will be set if a defect is present in the segment. If there are two segments in the data sector, the second bit will be set to indicate a defct in the segment. Similarly the third bit.

The next bit position of the flag field 60 is used to indicate whether ECC remainder and cross-check values are appended to the last data segment of the present data sector. This flag eliminates the requirement that the sequencer 150 keep track of a block byte count, and thus signals the included ECC circuitry 190 to the location of the appended ECC remainder and cross-check values.

A further bit position of the flag field 60 is used to indicate if a defect appears in the next ID header field 44. If this bit is set, the nominal location for the next ID header field 44 immediately following the next servo sector 38 is passed by, by extending the length of the AGC recovery field and by then writing the subsequent fields of the ID header 44 after passage of this additional delay period.

As already noted, each ID field 44 includes e.g. three error detection bytes which are used to verify the integrity of the information read back from the particular data ID field. These error detection code bytes (CRC) are selected to be suitable to indicate the integrity of the information read back from the particular CRC field. A separate circuit within the data sequencer 150 is provided for checking the CRC bytes from the ID header.

As an example, the ID header 44 graphed in FIG. 2B would include the following values in hexadecimal notation:

00 3F 7F00 00 12+CRC

The first data byte 00 denotes that there is no third segment in this data sector. The second data byte 3F denotes the count for the 256 data bytes located in Data Sector 1A (the count being the number of bytes divided by four with one being subtracted from the resulting quotient, for example). The third data byte 7F denotes the full 512 bytes contained in Data Sector 0. The fourth byte 00 is the flag byte and these values indicate that the first segment is the beginning of the user data block (Sector 0) and that there are no defects that need to be handled. The fifth byte 00 indicates the first sector number as 00 (Sector 0). The sixth byte 12 indicates the head/cylinder, and the three CRC bytes will have values dependent upon the particular CRC algorithm selected. The next data sector has segments 42-1B and 42-2A, and might have values as follows:

00 21 3F80 01 12+CRC

Figure 3A:
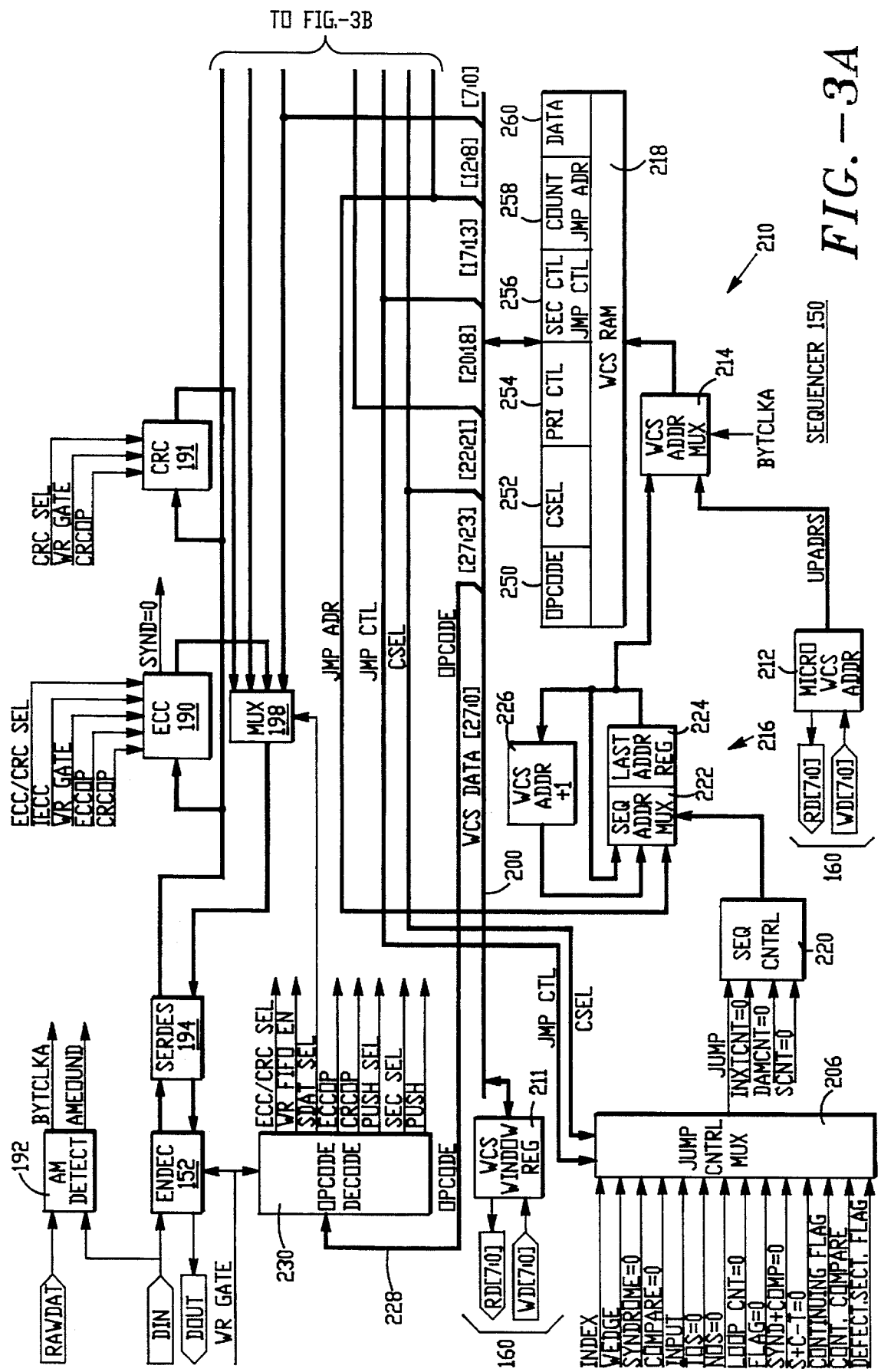
FIGS. 3A and 3B together provide a detailed block diagram of a data sequencer in accordance with principles and aspects of the present invention, wherein FIG. 3A comprises the left panel of the drawing, and FIG. 3B comprises the right panel thereof.
Figure 3B:
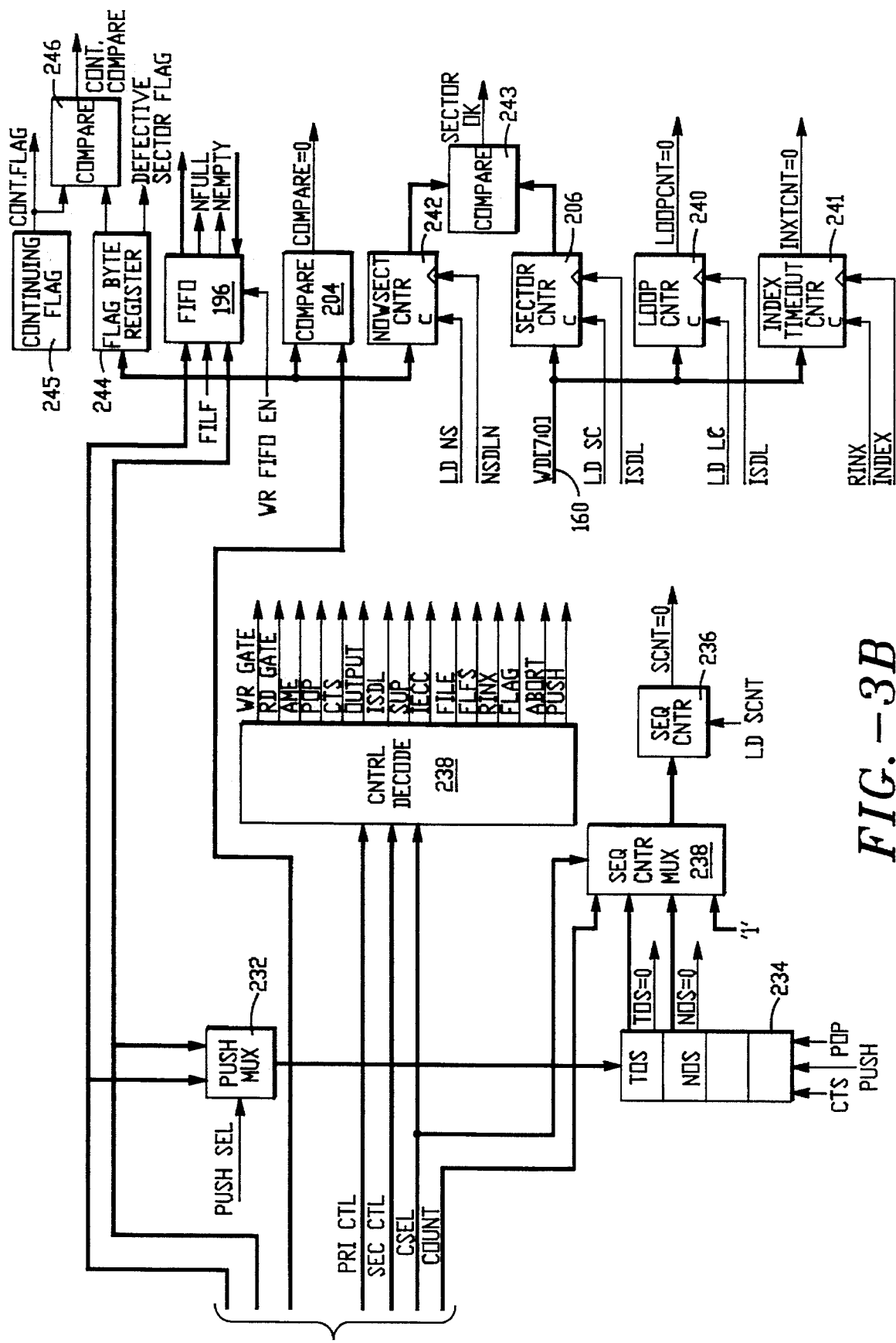

Turning now to FIG. 3, architectural details of the data sequencer 150 are given in greater structural detail. The data sequencer 150 includes an on-the-fly error correction circuit 190 similar to the one described in commonly assigned, copending U.S. patent application Ser. No. 07/650,791 filed on Feb. 1, 1991, and entitled: "On-The-Fly Error Correction with Embedded Digital Controller", now U.S. Pat. No. 5,241,546, patented on Aug. 31, 1993, the disclosure of which is hereby incorporated by reference. In this regard, it should be noted that the sequencer 150 actually tests the syndrome remainder values supplied from the circuit 190 to see if the values are zero. Each of three data interleaves is tested separately, and the results are latched for each interleave (if non-zero). This approach reduces to one-third the number of gates otherwise required to implement the sequencer's ECC test for zero logic tree.

Because the data ID fields now immediately follow each servo sector, the CRC values for each ID field cannot be processed in the error correction circuitry 190. Accordingly, a separate CRC circuit 191 is provided for computing and checking the CRC bytes associated with each ID header 44.

The data sequencer 150 also includes a data field address mark detector 192 which receives incoming data directly from the circuit read/write. The address mark detector 192 looks at the signal RAWDAT for a sequence of high frequency flux transitions, and when such is detected, a PLL within a data synchronizer portion of the drive's read channel is then locked onto the sequence and the recovered digital run length encoded data is checked for the presence of the address mark sequence, whether it is the header AM or the data AM. In this regard, the address mark detector 192 monitors the data stream in order to detect a unique bit sequence which is not consistent with the 1,7 encoding rules and which is predetermined to represent an address mark. The address mark detector 102 is described in greater detail in the present inventor's commonly assigned, copending U.S. patent application Ser. No. 07/710,065 filed on Jun. 4, 1991, and entitled "Fault Tolerant RLL Data Sector Address Mark Decoder", the disclosure thereof being incorporated by reference herein. The address mark detector 102 generates the byte clock signal BYTCLKA from the read data stream (DIN) as well as an address mark found (AMFOUND) control signal whenever a bit sequence representing an address mark is found in the read data stream (DIN). The byte clock signal BYTCLKA is defined as the data in clock divided by twelve and synchronized with detection of the address mark by the address mark detector 192.

A 1,7 run length limited encoder/decoder 152 encodes and decodes serial data into and from a 1,7 run length limited (RLL) code, and the serializer/deserializer (SERDES) 194 contained within the circuit 152 but separately shown for clarity in FIG. 3, bundles and unbundles data bytes into and from serial 2 bit format. A FIFO byte register 196 enables data bytes to be asynchronously transferred between the sequencer 150 and an external cache buffer memory array which is clocked by an external crystal clock standard (as opposed to the BYTCLKA which is synchronized with the read data stream read back from the disk).

A multiplexer 198 regulates bidirectional data flow through the serializer/deserializer 194 and encoder/decoder 152 so that ECC syndrome bytes generated by the ECC generator 190 may be appended to data blocks flowing to the storage surface of the disk 10, so that CRC values generated by the CRC circuit 191 may be appended to the ID headers 44, and so that data values present on a writeable control store (WCS) bus 200 may also be sent to the disk 10 for storage.

Reference data sector (i.e. physical sector and transducer head) identification bytes read from data ID fields are passed to a comparison circuit 204. The comparison circuit 204 compares actual data sector identification bytes received from the SERDES 194 with the reference identification bytes held in a sector count data field 260 of a writeable control store 210. If a correspondence exists, the desired sector location has been reached, and a Compare =0 control signal is put out by the comparison circuit 204 to a jump control multiplexer circuit 208. The jump control multiplexer 208 provides a jump output whenever any one of a number of different control inputs become true, such as when a once around Index signal is present, when a servo sector 38 (Wedge) is present, when an ECC syndrome equals zero, when the compare signal from the comparator 204 is zero, when an input flag is set, when a top-of-stack count is zero, when a next-of-stack count is zero, when loop count is zero, when flag is set, when a continuing flag is set, when a continuing compare flag is set, or when the defective sector flag is set, for example.

A target sector counter 206 includes a target sector number register which may be directly written by the microcontroller via the bus 160. The sector counter 206 may be incremented by the sequencer program for multiple sector transfers. This register enables determination of the starting sector of a transfer, and works in conjunction with a "now sector" counter 242 and a compare circuit 243. The now sector counter 242 contains the present sector number as read from the ID header 44 sector number field. This counter may also be incremented under sequencer program control. A sector rollover value register is also provided which contains a value equal to the maximum number of data sectors permitted in the particular data zone, if the target sector counter 206 or the now sector counter 242 are incremented while their values were equal to the sector roll value held in the rollover value register, the next value will be zero.

The data sequencer 150 is most preferably implemented as a programmable state machine. Accordingly, a writeable control store (WCS) 210 is provided for containing code words which define progressively the various states of the sequencer 150. The WCS 210 stores sequencer control words which control all of the operational states of the sequencer 150. The WCS 210 may be loaded with information directly written by a drive microcontroller with data supplied via a microcontroller data register 211 at WCS locations controlled by addresses decoded by a microcontroller address decoder 212.

The WCS 210 accepts control words which are e.g. 28 bits long. Each command line comprises a number of fields. One field is a 5-bit OPCODE field 250, a 2-bit count select field 252, a 3-bit primary control field 254, a 5-bit secondary control field 256, a 5-bit count field 258, and an 8-bit data field 260. Two of the fields, namely the secondary control field 256 and the bit count field 258 are dual purpose. During a count type command, as selected by a 00 value in the count select field 252, the field 256 contains the secondary control, and the field 258 contains a count specified in the command word. During a jump type command, selected by 01, 10 or 11 values in the count select field, the field 256 contains a jump control, and the field 258 contains a jump address. For both types of command words, the opcode, primary control and data fields 250, 254 and 260 are identical in function.

During one half of the BYTCLKA clock cycle, a multiplexer 214 enables direct access by the microcontroller to the control store 210. During the other half of the BYTCLKA cycle, addresses from a sequence controller 216 are used to address the control store memory area 218. The sequence controller 216 includes a sequence control decoder block 220 which enables the controller 216 to jump to a plurality of predetermined states, a sequence address multiplexer 222 which selects between various possible addresses, a last address register 224 for holding the last sequencer address for application to the control store 210 via the multiplexer 214, and a writeable control store address +1 incrementer 226 which selectively feeds back the next address from the one held in the register 224 to the sequence address multiplexer 222.

The sequence controller 216 is directly controlled by the jump control multiplexer 208 which generates a jump control signal when the value of the count select field 252 indicates a jump type control word. The jump control signal is generated from the plurality of logical inputs to the jump control multiplexer 206 discussed above and as indicated in FIG. 3. The 28 bit wide writeable control store (WCS) data bus 200 directly communicates with the writeable control store 210 and enables the values held therein to circulate throughout the sequencer 150 along the paths shown in FIG. 3.

Specifically, an opcode bus 228 leads to an opcode decoder 230 which decodes each five bit opcode from the opcode field 250 into a plurality of logical conditions on the control lines shown coming out of the opcode decoder 230. For example, a PUSH SEL line extends from the opcode decoder to a push multiplexer 232 which enables e.g. data field count bytes C3, C2 and C1 to be pushed directly onto the top of a four byte register stack 234. A top of stack (TOS) bus and a next of stack (NOS) bus connect the stack 234 to a byte sequence counter 236 via a multiplexer 238 which also has the ability to load the sequence counter 236 with value of "1".

The byte sequence counter 236 maintains a present state byte count (remaining bytes within the present state of the sequencer 150). When the presently loaded byte count increments to zero, the end of a particular sequencer state is reached, and the sequence counter 236 puts out a SCNT=0 value to the jump control multiplexer 208, so that a next sequencer state may then be invoked.

A control decoder 238 receives primary control values from the primary control field 254 and secondary control values from the secondary control field 256 (during a count type command word as controlled by the count select values from the field 252). The control decoder 238 decodes these values into specific logical control values which are put out over the control lines shown coming out of the decoder 238 in FIG. 3, including the write gate signal WRGATE and an initialize ECC signal IECC which directly control the ECC syndrome generator 190, for example. Push and pop signals for controlling the stack 234 are also put out from the control decoder 238. The control decoder 238 also puts out write gate and read gate controls. Write gate is used to control data writing to disk operations, whereas read gate is used to lock up the PLL to data during read back operations from the disk.

A loop counter 240 is preset with a number of loops to be made during a particular data block transfer transaction (each loop nominally represents the states required to transfer a data block), and generates a LOOPCNT=0 control value when the count reaches zero. This control value signifying that the required number of data blocks has been transferred is also provided to the jump control multiplexer 208. An index timeout counter 241 keeps track of the beginning of each track by generating an index timeout value INXCNT=0 which is used to control the sequence controller 216. A once per revolution raw index signal stored in the first one of the servo sectors 38 is detected by a servo control circuit and used to clock the index timeout counter 242. Other inputs to the sequence controller 216 are the jump value from the jump control multiplexer 208, the address mark found value AMFOUND from the address mark detector 192, and the byte sequence counter SCNT=0 value from the sequence counter 236.

A flag byte register 244 receives and latches the flag byte from the incoming data stream. The lowest order flag bit is put out directly to the jump control multiplexer 208. An internal register 245 provides a continuing flag to the jump control multiplexer 208. The continuing flag indicates that the next data segment is expected to be a continuation from a previous segment of the data block. The high order flag bits, being continuing flags, are then compared with the continuing flag. The result of this comparison is then supplied to the jump control multiplexer 208. The flag byte may be shifted, a O being put in the most significant position, and all other bits shifted toward the lower order.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A disk drive including a rotating data storage disk, a data transducer head producing Barkhausen noise when switching from a write mode to a read mode in a data channel connected thereto and a data sequencer means connected to the data channel, a servo controlled head positioner for positioning the data transducer among concentric data storage tracks defined as magnetic flux transition patterns on a surface of the disk, a plurality of embedded servo sectors recorded at a predetermined constant frequency across the radial extent of the disk surface and containing head positioning information recorded asynchronously with respect to user data and read by the data transducer head and recovered by a servo data recovery circuit, connected to the data channel, the concentric data storage tracks arranged as a plurality of radially offset circumferential data zones of contiguous tracks, each track of a said zone having a data transfer rate and storage capacity adapted to radial offset of the zone from a center of the disk, a data sector for blocks of the user data being formed between adjacent servo sectors and adapted to contain a plurality of variable length data segments of fixed length user data blocks, each data sector including one ID header, located immediately after each servo sector, the ID header including a plurality of count byte fields, each count byte field for providing to the data sequencer means a count of a variable number of bytes of each variable length user data block segment within the data sector, and a flag field for indicating whether a data block begins at a first user data block segment of a particular data sector next thereafter to be read by the data transducer head.

2. The disk drive in accordance with claim 1 further comprising a pad field at the end of a data sector immediately preceding a said servo sector, and wherein the disk drive includes timing means for transitioning the data transducer head from a data writing mode to a data reading mode while the pad field is passing underneath the data transducer.

3. The disk drive in accordance with claim 2 further comprising an AGC field at the beginning of each servo sector for providing a data reference for an automatic gain adjustment to the data channel for the servo sector.

4. The disk drive in accordance with claim 1 wherein the flag field further includes a defective sector flag for signaling the sequencer means that the data sector contains a defect.

5. The disk drive in accordance with claim 1 wherein the flag field further includes an error correction flag for indicating to the sequencer means that a segment includes an error correction field.

6. The disk drive in accordance with claim 1 wherein the flag field further includes an ID header field defect flag for signaling the sequencer means that the next ID header field location contains a defect.

7. The disk drive in accordance with claim 1 wherein a data block extends across a series of data sectors, and wherein the flag field includes a flag for indicating to the sequencer means whether a data segment of the data sector is one of a beginning segment, an intermediate segment and an ending segment.

8. The disk drive in accordance with claim 1 wherein the sequencer means includes a count byte stack, and wherein each of the plurality of count byte fields read from an ID header is pushed onto the stack upon being read from the disk, and further wherein a byte field of the plurality of count byte fields is transferred from the stack to a segment byte counter means within the sequencer means as the disk drive is about to read a segment having a byte count indicated by said byte field.

* * * * *